Sept. 28, 1948. A. O. BUSH 2,450,230
GRINDING WHEEL CHUCK
Filed March 16, 1946
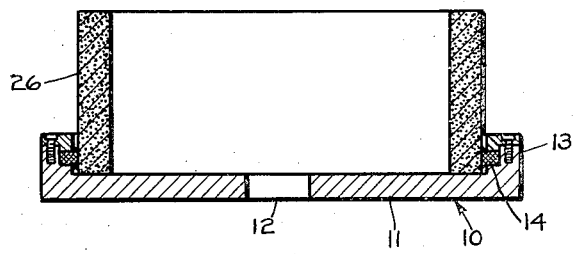
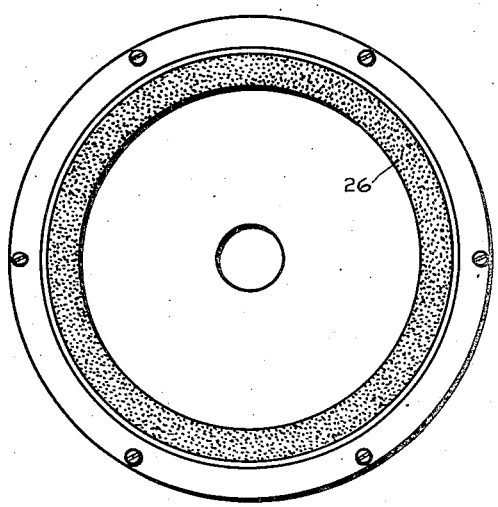
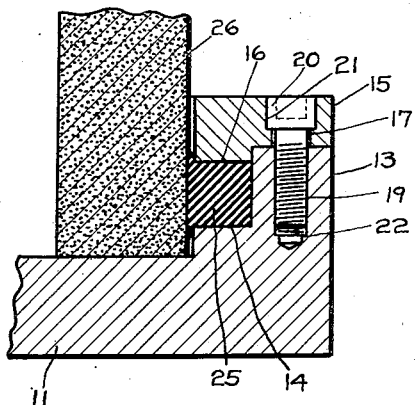
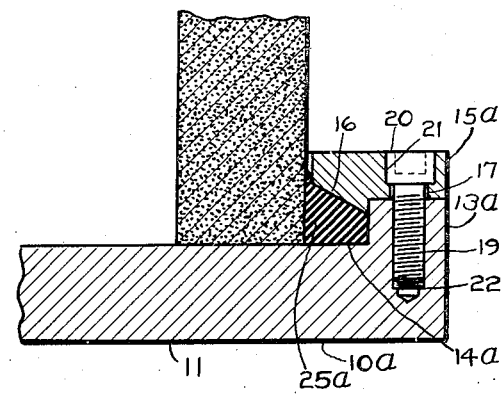
Inventor
ALONZO OAKLEIGH BUSH
By George Crumpton
Attorney Patented Sept. 28, 1948

2,450,230

UNITED STATES PATENT OFFICE 2,450,230

GRINDING WHEEL CHUCK

Alonzo Oakleigh Bush, Worcester, Mass., assignor to Norton Company, Worcester, Mass., a corporation of Massachusetts Application March 16, 1946, Serial No. 654,945

1 Claim. (Cl. 51—209)

The invention relates to chucks for grinding wheels.

One object of the invention is to provide a chuck which can be quickly opened and closed. Another object is to provide a chuck which will not crack a thin hollow cylindrical grinding wheel even when used by inexperienced persons. Another object is to provide a chuck to hold grinding wheels which holds them resiliently thus reducing breakage in use. Another object of the invention is to provide a simple and practical chuck of low manufacturing cost.

Other objects will be in part obvious or in part pointed out hereinafter.

The invention accordingly consists in the features of construction, combination of elements, and arrangements of parts, as will be exemplified in the structure to be hereinafter described, and the scope of the application of which will be indicated in the following claim.

In the accompanying drawings illustrating two of many possible embodiments of the mechanical features of the invention.

Figure 1 is a cross sectional view of the chuck showing a hollow cylindrical grinding wheel held thereby;

Figure 2 is a front elevation of the chuck and wheel;

Figure 3 is a fragmentary cross sectional view on an enlarged scale of the chuck and wheel more clearly to show the construction;

Figure 4 is a view similar to Figure 3 showing another embodiment of the invention.

Referring to Figures 1, 2 and 3, I provide a chuck plate 10 which comprises a disc portion 11 having a centrally located mounting hole 12, an annular lip 13 and a ledge 14. The plate may be mounted on a spindle which may extend through the hole 12. I further provide a clamping ring 15 having on the inner face thereof an annular ridge 16. The chuck plate 10 and its parts as well as the clamping ring 15 may be made of any suitable material, a metal such as steel being preferred.

Extending through the outer portion of the clamping ring 15 outside of the ridge 16 are a plurality of countersunk holes 17. Clamping screws or bolts 19 are located in these holes preferably with their heads 20 in the countersinks 21 thus eliminating danger to the operator from revolving bolt heads. The screws 19 extend into threaded holes 22 in the lip 13 of the chuck 10, the holes 22 being parallel to the axis of the chuck.

I provide a ring 25 of rubber or other resilient material having the deformable characteristics of rubber. Synthetic rubber or like material may be used. Originally this ring 25 may be rectangular in cross section; the drawings show it after it has been compressed. It also may be of various shapes in cross section as long as it can be compressed between the ledge 14 and the ridge 16 when they are moved towards each other by tightening the clamping screws 19.

When the parts are first assembled the clamping ring 15 does not touch the lip 13 because the rubber ring 25 is too thick. But when the screws 19 are tightened, the rubber ring 25 is compressed between the ridge 16 of the clamping ring 15 and the ledge 14 of the chuck plate 10 and expands as shown to grip the grinding wheel 26. This provides a secure and even grip all around the wheel which will not crack a thin hollow wheel and at the same time reinforces it against disintegration due to centrifugal force at high speeds. It also centers the wheel on the shaft.

Figure 4 shows an embodiment of the invention in a modified form. A chuck plate 10a comprises a disc portion 11, an annular lip 13a and a seat 14a. I further provide a clamping ring 15a having on the inner face thereof a bevelled ridge 16. The chuck plate 10a and its parts as well as the clamping ring 15 may be made of any suitable materials, steel or similar metal being preferred.

Extending through the outer portion of the clamping ring 15 outside of the ridge 16 are a plurality of countersunk holes 17. Clamping screws or bolts 19 are located in these holes preferably with their heads 20 in the countersinks 21. The screws 19 extend into threaded holes 22 in the lip 13a of the chuck 10a, the holes 22 being parallel to the axis of the chuck.

I provide a ring 25a of rubber or other resilient material having the deformable characteristics of rubber. Synthetic rubber like material may be used. Originally this ring 25a may be a trapezoid in cross section; the drawings show it after it has been compressed. It also may be of various shapes in cross section as long as it can be compressed between the seat 14 and the ridge 16 when they are moved towards each other by tightening the clamping screws 19.

When the screws 19 are tightened, the resilient ring 25a is compressed between the ridge 16 of the clamping ring 15 and the ledge 14a of the chuck plate 10a and expands as shown to grip the grinding wheel 26. This embodiment of the construction has the additional advantage of allowing more of the grinding wheel to be worn away in grinding before it needs to be replaced.

In both embodiments of the invention set forth herein, mounting a grinding wheel in the chuck is a quick and simple operation even for an inexperienced operator, and dismounting it is just as simple.

It will thus be seen that there has been provided by this invention an apparatus in which the various objects hereinabove set forth together with many thoroughly practical advantages are successfully achieved.

As many possible embodiments may be made of the above invention and as many changes might be made in the embodiments above set forth, it is to be understood that all matter hereinbefore set forth or shown in the accompanying drawings is to be interpreted as illustrative and not in a limiting sense.

I claim:

A chuck for holding hollow cylindrical grinding wheels comprising a disc shaped plate, a lip on the periphery of and integral with said plate, a portion of said plate inside of said lip constituting a seat, a continuous resilient ring made of deformable rubber like material of a diameter and having a surface to fit said seat inside of said lip, a continuous rigid clamping ring having a portion overlying said lip with screw holes therethrough and said clamping ring having another portion overlying said resilient ring, and screws extending through said holes in said rigid clamping ring and into said lip and, when tightened, compressing said rigid clamping ring against said resilient ring which is squeezed between and by the portion of the rigid ring overlying it and the seat, thus forcing some material of the resilient ring inwardly into clamping engagement with a hollow cylindrical grinding wheel.

ALONZO OAKLEIGH BUSH.

REFERENCES CITED

The following references are of record in the file of this patent:

UNITED STATES PATENTS

| Number | Name | Date |
| --- | --- | --- |
| 648,955 | Hendricks et al. | May 8, 1900 |
| 933,603 | Wagg | Sept. 7, 1909 |
| 1,928,314 | Koss | Sept. 26, 1933 |
| 2,187,350 | Kuzmick | Jan. 16, 1940 |
| 2,366,778 | Feichter | Jan. 9, 1945 |

FOREIGN PATENTS

| Number | Country | Date |
| --- | --- | --- |
| 122,174 | France | June 19, 1919 |
| 504,055 | Germany | Aug. 1, 1930 |
| 851,759 | France | Oct. 9, 1939 |